Oct. 24, 1933.  T. MORISHITA  1,931,963

CLINICAL THERMOMETER

Filed July 10, 1931

INVENTOR.
T. Morishita
BY
ATTORNEY.

Patented Oct. 24, 1933

1,931,963

UNITED STATES PATENT OFFICE 1,931,963

CLINICAL THERMOMETER

Tsugiko Morishita, Higashi-Ku, Osaka-Shi, Japan

Application July 10, 1931. Serial No. 549,974

2 Claims. (Cl. 73—52)

This invention relates to clinical thermometers and has for its object to provide a clinical thermometer easily visible of the rise of fluid in the tube on determining one's temperature.

Figure 1:
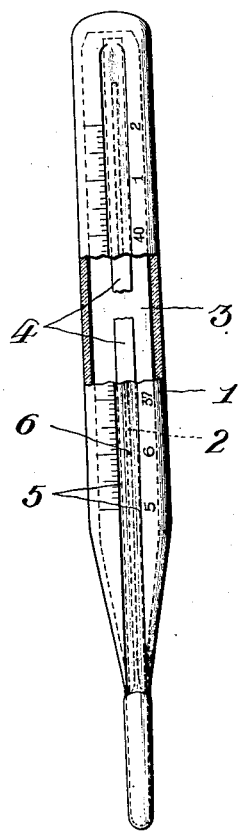
Fig. 1 is a front view of the thermometer according to the invention.
Figure 2:
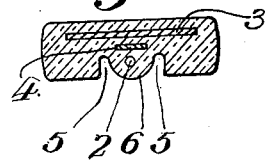
Fig. 2 is a transverse sectional view of the thermometer, on a larger scale than used in Fig. 1.

Referring to the drawing, 1 represents a glass body of a clinical thermometer, which is of a substantially flat rectangular shape in cross section as shown in Fig. 2. 2 represents a capillary hole for mercury as usual, 3 a white colored glass plate member disposed near the back of the body and 4 another glass strip member of a smaller width than that of the said member 3 and of other color, such as red color, interposed between the capillary hole 2 and the said member 3. The glass strip member 4, may, however, be dispensed with. The body 1 is formed at its front side with two grooves 5 of V shape with slightly curved sides in cross section, and longitudinally extending in parallel, a ridge 6 of a substantially semi-circular shape in cross section being interposed between these grooves. The graduation is provided on the outer side of a groove. Whilst temperature indicating numerals are set down on the outer side of another groove, as shown in Fig. 1. The other general construction may be made in known manner and will not need further description. With this construction of the thermometer, the rise of mercury in the tube will be clearly visible due to the provision of the grooves and the ridge, such glittering as caused by reflection of light in the thermometer with a smooth flat face being avoided.

Having now particularly described and ascertained the nature of my said invention and in what manner the same is to be performed, I claim:

1. A clinical thermometer comprising a rectangular shape glass body having on its front, longitudinal side, two grooves of substantially V shape with sides slightly curved in cross section, the said grooves extending longitudinally of the thermometer in substantially parallel relation, and a ridge substantially semicircular in cross section interposed between the said grooves.

2. A clinical thermometer, comprising a flat rectangular glass body, having at its front face two grooves of substantially V shape and having slightly curved sides in cross section, the said grooves extending longitudinally along the face of the thermometer in substantially parallel relation and substantially symmetrically with the transverse, vertical axis of the thermometer, a ridge of substantially semi-circular shape, interposed between said grooves, and having its apex substantially on the said transverse axis and in substantially the same plane as the face of the thermometer, and scale divisions and numerals placed along the said face at the sides of the grooves.

TSUGIKO MORISHITA.